July 7, 1959  C. PACE  2,894,158
MOTOR WINDING
Filed Aug. 31, 1956
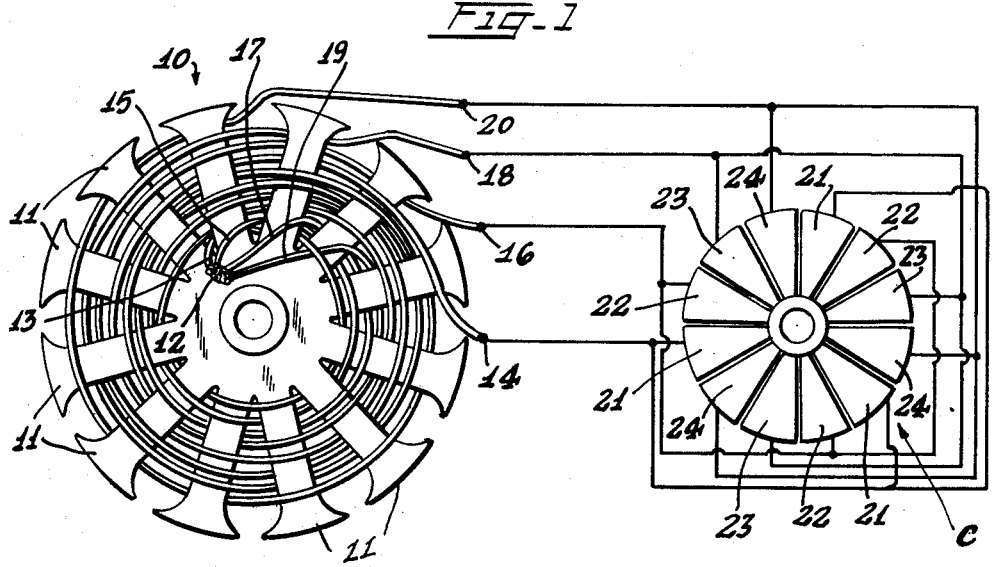
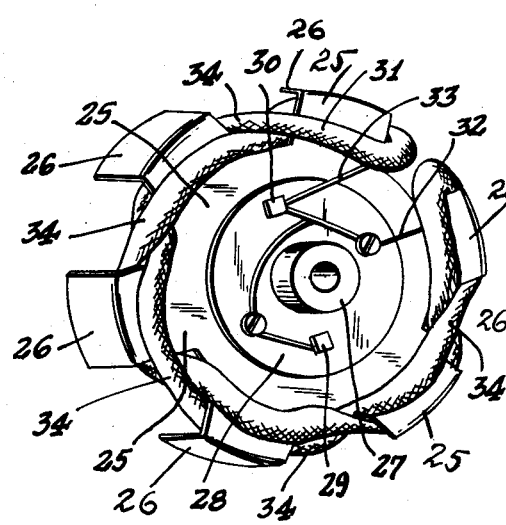  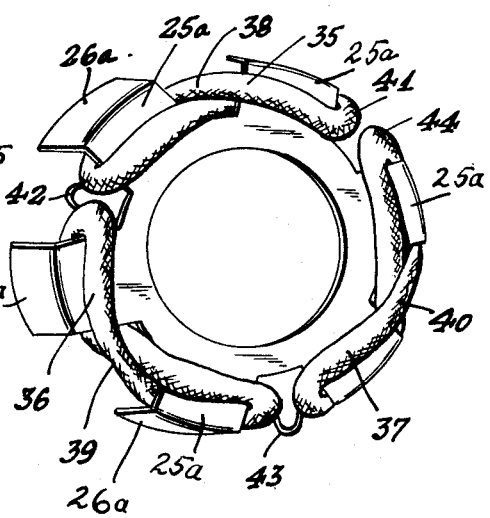
INVENTOR.
CANIO PACE
BY
H. G. Manning
ATTORNEY.

United States Patent Office 2,894,158
Patented July 7, 1959

2,894,158

MOTOR WINDING

Canio Pace, Waterbury, Conn.

Application August 31, 1956, Serial No. 607,395

1 Claim. (Cl. 310—180)

This invention relates to electric motor and generator windings and more particularly to multipolar rotor and stator structures operable on both A.C. and D.C. currents.

One object of this invention is to provide a distributive type of winding in a rotor or stator which will give a high voltage strength for the conductors, by the use of what is known in the trade as a "whole coil."

Another object is to provide a method of winding rotors and stators for electric motors and generators, so as to take the minimum space, the least amount of wire, and the least amount of magnetic material, resulting in a light weight economical machine with enhanced efficiency.

A further object is to wind the coils of a rotor all at one time in a basket weave-like design, with coils of the same length, to produce a pleasing and well balanced construction.

It is a further object to provide a rotor of the above nature, which will operate efficiently with any conventional type of stator having multiple alternate north and south poles.

A still further object of this invention is to provide a method of winding a stator so as to take the least space with a single twisted coil, or a group of "figure eight" coils, to permit the use of a large diameter rotor giving a high leverage torque.

A still further object is to provide a motor of the above nature which will be simple in construction, inexpensive to manufacture, easy to assemble and manipulate, compact, ornamental in appearance, and very efficient and durable in use.

With these and other objects in view, there have been illustrated on the accompanying drawing, three forms in which the invention may conveniently be embodied in practice.

In the drawing,

Fig. 1 is an end view of one form of rotor winding in accordance with this invention, showing diagrammatically the connections to a motor commutator, Fig. 2 is a perspective view of one form of winding for a stator, and Fig. 3 is a perspective view of a modified form of stator winding also embodying the invention.

Referring now to the drawings, in which like reference numerals denote corresponding parts throughout the several views, the numeral 10 indicates generally a rotor, which may be of any conventional construction such as shown in my prior Patent No. 2,569,330, issued September 25, 1951, and having a plurality of spaced salient poles 11, preferably of an even number. In the form shown in Fig. 1 herein, the rotor 10 is provided with twelve poles 11 having four windings or coils 13, 15, 17, 19 thereon, said coils being connected together in a manner known in the trade as a "star," and having a common connection at one end indicated by the numeral 12.

Each of the coils 13, 15, 17, 19 is wound on the poles 11 in a basket weave design, passing first along the same axial face of two of the successive poles 11, then crossing to the opposite axial face of the next two poles, and being alternately brought across to the other face, after passing two successive poles, until the winding is completed.

The termination of the first winding coil 13 is indicated at 14. The second winding 15 is staggered circumferentially following the beginning of the first winding 13, and is wound in the same manner as the first winding by passing across the same axial face of two successive poles 11, and thereafter being shifted alternately to opposite axial faces of successively following pairs of poles 11, and terminating at 16.

The same is true of the third and fourth windings 17, 19, which terminate respectively at 18 and 20. The termination 14 of the first winding may then be connected to the three segments 21 of a commutator C of a conventional construction, which rotates with the rotor 10. The terminations 16, 18 and 20 of the second, third and fourth windings may then be connected respectively to segments 22, 23 and 24 of said commutator.

Fig. 2 shows one form of stator comprising a radial portion having a plurality of salient poles 25 provided with axially offset ends 26. Any number of such poles may be provided, preferably an even number. In the form shown, a bearing 27 for the rotor shaft is centrally supported by a circular disk 28 of insulating material, which also supports a pair of brush holders 29 and 30.

The winding of this stator may comprise a plurality of fine wires which are wound in a continuous loop and wrapped in a protective covering 31. One end 32 of this winding is connected to the brush holder 29 while the other end 33 is connected to the brush holder 30. The coils of wires of the stator are then interwoven between each of the poles 25, by crossovers 34, so that successive poles 25 will have opposite polarities.

Fig. 3 shows a modified form of stator having salient poles 25a with axially extending end faces 26a. The windings in this form of stator comprise a plurality of bundled coils 35, 36, and 37, each of which is of a size sufficient to surround only one pair of adjacent poles 25a, being twisted at their mid-points 38, 39 and 40 respectively, so as to give opposite polarities to each pair of poles.

One end 41 of the coil 35 comprises a lead for the entire winding, and the three coils 35, 36, and 37 may be connected in series by the wires 42 and 43, while the wire 44 leading from the coil 37 forms the other lead for the winding as a whole.

It will be understood that while the winding shown in Fig. 1, is shown herein as applied to a rotor, it may also be used as a stator winding, and that the stator windings shown in Figs. 2 and 3 may equally well be applied to the winding of a rotor within the spirit and scope of this invention.

It will also be understood that while a series type of winding has been shown herein, the coils may also be connected in parallel or in other conventional combinations well known in the art.

While there have been disclosed in this specification three forms in which the invention may be embodied, it is to be understood that these forms are shown for the purpose of illustration only, and that the invention is not limited to the specific disclosures, but may be modified and embodied in various other forms, without departing from its spirit. In short, the invention includes all the modifications and embodiments coming within the scope of the following claim.

Having thus fully described the invention what is claimed as new and for which it is desired to secure Letters Patent is:

In a rotor for an electromotive machine, a circular magnetic element mounted on a central shaft, said element being provided with a plurality of radial salient poles arranged successively around the axis of said shaft and lying in a common plane, and a plurality of winding conductors connected together at their inner ends and arranged circumferentially about said element and woven in succession over two adjacent poles and under the next two adjacent poles, throughout the circumference of said element, each of said winding conductors being successively angularly offset with respect to the preceding winding conductor.

References Cited in the file of this patent
UNITED STATES PATENTS

| | | |
|---|---|---|
| 744,145 | Wiard | Nov. 17, 1903 |
| 2,404,129 | Flatland | July 16, 1946 |

FOREIGN PATENTS

| | | |
|---|---|---|
| 19,732 | Australia | Feb. 5, 1936 |
| 793,410 | France | Nov. 16, 1935 |